United States Patent [19]

Brazas, Jr.

[11] Patent Number: 5,511,059
[45] Date of Patent: Apr. 23, 1996

[54] MULTI-ELEMENT GRATING BEAM SPLITTER WITH A REFLECTION GRATING ELEMENT FOR USE IN FRONT FACET SUBSTRACTION

[75] Inventor: John C. Brazas, Jr., Hilton, N.Y.

[73] Assignee: Eastman Kodak Company, Rochester, N.Y.

[21] Appl. No.: 259,587

[22] Filed: Jun. 14, 1994

[51] Int. Cl.$^6$ ................................................. G11B 7/00
[52] U.S. Cl. ...................... 369/109; 369/112; 369/116; 369/120; 369/44.37
[58] Field of Search ....................... 369/109, 110, 369/112, 116, 120, 122, 44.23, 44.37, 44.38; 250/201.5

[56] References Cited

U.S. PATENT DOCUMENTS

| | | | |
|---|---|---|---|
| 4,689,479 | 8/1987 | Tatsuno et al. | 369/120 |
| 4,731,772 | 3/1988 | Lee | 369/112 |
| 4,894,815 | 1/1990 | Yamanaka | 369/112 |
| 4,945,529 | 7/1990 | Ono et al. | 369/109 |
| 4,983,017 | 1/1991 | Tsuji et al. | 369/44.11 |
| 5,050,153 | 9/1991 | Lee | 369/112 |
| 5,136,152 | 8/1992 | Lee | 369/112 |
| 5,172,368 | 12/1992 | Lehurea | 369/112 |
| 5,270,996 | 12/1993 | Ono | 369/110 |
| 5,363,363 | 11/1994 | Gage | 369/116 |

OTHER PUBLICATIONS

W. Ophey, "Compact Optical Light Paths," Jpn. J. Appl. Phys., vol. 32, Part I, No. 11B, pp. 5252–5257, Nov. 1993.
E. Gage and S. Beckens, "Effects of high frequency injection and optical feedback on semiconductor laser performance", SPIE Proceedings, vol. 1316, Optical Data Storage, pp. 199–204, Mar. 1990.
Gray, et al., "Control of optical–feedback–induced laser intensity noise in optical data recording", Optical Engineering, vol. 32, No. 4, pp. 739–745, Apr. 1993.
S. Kadowaki, et al., "Integrated Holographic Optical Pickup Head with Wide Allowance Range," Proc. Int. Symp. on Optical Memory 1989, Jpn. Jnl. of Appl. Phys., vol. 28, Supplement 28–3, pp. 189–192, 1989.
M. Kato, et al., "Recent advances in optical pickup head with holographic optical elements," SPIE Proceedings, vol. 1507, Holographic Optics III: Principles and Applications, pp. 36–44, 1991.
M. Kato, et al., "Holographic Servo–Signal Detection Stabilized to the Wavelength Fluctuation and the Mechanical Misalignment in the Optical Heads," SPIE Proceedings, vol. 1078, Optical Data Storage Topical Meeting, pp. 122–126, 1989.
A. Marchant, "Optical Recording: A Technical Overview," Addison–Wesley, Reading, Mass., pp. 172–179.
Laser Diode User's Manual, Sharp Corp., Hologram Laser Unit Data Sheet, Models LTOH30P, LTOH30M, LTOH31P and LTOH12M, p. 2, 1993.
Pencom International Corp., Laser/Detector Optical Head Data Sheet, Models 50 and 60, 1993.
Philips Corp., Radialinear CD Mechanisms Data Sheet, Models CDM–9 and CDM–12, 1993.
Blue Sky Research, San Jose, Calif., Data Sheet, Model VPS700 lens, 1992.

*Primary Examiner*—Loha Ben
*Attorney, Agent, or Firm*—Raymond L. Owens

[57] ABSTRACT

A multi-element grating beam splitter with a reflection grating for use in providing a front facet detector signal in an optical system. The multi-element grating beam splitter includes first, second, third, and fourth grating elements for separating a return beam reflected and diffracted from a data track on an optical storage medium into first, second, third and fourth portions, respectively. The grating beam splitter also includes a fifth grating element, which is preferably a reflection grating, for directing a portion of an incident radiation beam onto a front facet detector. The front facet detector signal may be subtracted from a data signal resulting from detection of the first, second, third and fourth portions of the return beam in order to limit the effect of optical source noise on the data signal.

16 Claims, 3 Drawing Sheets

MULTI-ELEMENT GRATING BEAM SPLITTER WITH A REFLECTION GRATING ELEMENT FOR USE IN FRONT FACET SUBSTRACTION

CROSS-REFERENCE TO RELATED APPLICATIONS

The present invention is related to the following U.S. patent applications: "Apparatus and Method for a Dual Half-Aperture Focus Sensor System," Ser. No. 07/998,179, now U.S. Pat. No. 5,406,541; "Apparatus and Method for Laser Noise Cancellation in an Optical Storage System Using a Front Facet Monitor Signal," Ser. No. 07/961,965, now U.S. Pat. No. 5,363,363; "Single Return Path Orthogonally-Arranged Optical Focus and Tracking Sensor System," Ser. No. 08/259,655; and "Read/Write Laser-Detector-Grating Unit (LDGU) With An Orthogonally-Arranged Focus and Tracking Sensor System," Ser. No. 08/259,428, all assigned to the assignee of the present invention. The disclosures of these related Applications are incorporated herein by reference.

FIELD OF THE INVENTION

The present invention relates generally to optical read/write heads used in optical information storage and retrieval systems. More particularly, the present invention relates to optical heads which include a laser-detector-grating unit (LDGU) and use a focus and tracking sensor system to control the position of a radiation beam relative to an optical storage medium.

DESCRIPTION OF THE PRIOR ART

In many optical information storage and retrieval systems, a radiation beam from an optical source is reflected and diffracted from a data track on an optical storage medium. The beam returning from the storage medium may be directed to a detector array that provides signals used to generate, for example, a focus error signal (FES), a tracking error signal (TES) and a data signal. The FES and TES generally drive servo systems for maintaining the radiation beam in-focus and on-track, respectively, relative to the storage medium. The data signal is indicative of the data stored on the data track scanned by the radiation beam. The portion of the optical system which generates and processes the radiation beam is generally referred to as an optical head.

The stability of an optical head is usually improved by decreasing the distance between certain critical components, such as an optical source, beam splitter and detector array. In addition, the cost and complexity of the optical head is reduced if these components are integrated into a single package. A known technique for accomplishing these objectives involves combining components such as an optical source, a grating beam splitter and a detector array into an integrated package generally referred to as a laser-detector-grating unit (LDGU). LDGUs are also known as laser/detector optical heads and hologram laser units. Optical systems which incorporate an LDGU or a similar device will be referred to herein as LDGU-based systems. A number of exemplary LDGU-based systems are described in W. Ophey, "Compact Optical Light Paths," Jpn. J. Appl. Phys., Vol. 32, Part 1, No. 11B, pp. 5252–5257, November 1993. Other LDGU-based systems are described in, for example, U.S. Pat. Nos. 5,050,153 and 4,945,529. An exemplary optical head in accordance with U.S. Pat. No. 4,945,529 includes a diffraction grating with four grating regions. The four grating regions direct portions of a reflected and diffracted radiation beam to a detector assembly in order to generate an FES, a TES and a data signal.

The above-noted LDGU-based systems suffer from a number of drawbacks. For example, the optical source is generally not sufficiently isolated from the return beam, resulting in increased optical source noise. The optical source noise may result from phenomena such as longitudinal mode-hopping. Existing LDGUs also typically have an inherently low throughput efficiency, due in part to the fact that the radiation beam is generally not circularized. A circularized radiation beam is rotationally symmetrical about its optical axis. Throughput efficiency may be defined in terms of a percentage of optical source radiation which is transferred to the surface of the optical storage medium. Currently available LDGUs used for reading optical disks have throughput efficiencies on the order of only about 10%, with a considerable amount of the optical source output lost in the grating beam splitter and in truncating the non-circularized radiation beam. Although LDGUs are now commonly used for read-only applications such as compact disk (CD) players, the problems of source noise and low throughput efficiency have limited the usefulness of LDGUs in higher power applications such as optical recording.

In addition, some LDGU designs exhibit excessive optical cross-talk between tracking and focus signals. The optical cross-talk originates from, for example, diffracted radiation components and optical wavefront aberrations in the return beam. The presence of optical cross-talk may limit the effectiveness of LDGUs in certain optical systems, particularly those systems which utilize high performance focus and tracking servomechanisms. Although the above-cited U.S. patent application Ser. No. 07/998,179 reduces the effect of cross-talk in optical heads by implementing an orthogonality condition between the focus and tracking sensors, it does so by using separate optical paths for generating the focus and tracking signals. The need for additional components to create and process separate optical paths adversely affects the cost and complexity of the optical head.

As is apparent from the above, a need exists for an LDGU with increased throughput efficiency and less sensitivity to optical source noise, which is well-suited for use in optical recording applications, and which exhibits reduced optical cross-talk without requiring additional optical components.

SUMMARY OF THE INVENTION

The present invention provides an apparatus and method for generating a front facet detector signal from an incident radiation beam. The front facet detector signal may be used in front facet substraction in order to limit the effect of optical source noise on, for example, a data signal. In accordance with one aspect of the present invention, a multi-element grating beam splitter is provided for use in an optical system. The optical system includes an optical source for generating a radiation beam to be applied to a data track of an optical storage medium. The grating beam splitter includes a first grating element and a second grating element, arranged on opposite sides of a plane substantially parallel to a reference plane defined by an optical axis of the radiation beam and a tangent to the data track. The first and second grating elements separate first and second portions, respectively, of a return beam resulting from application of the radiation beam to the data track, along at least one plane substantially parallel to the data track. The grating beam splitter also includes a third and a fourth grating element, arranged adjacent to and on opposite sides of the first and the second grating elements, to separate a third and a fourth portion, respectively, of the return beam along planes substantially perpendicular to the reference plane. The grating beam splitter also includes a fifth grating element for directing a portion of the radiation beam to a front facet detector.

The first and second portions of the return beam may be used to generate a tracking error signal, and the third and fourth portions may be used to generate a focus error signal. The front facet detector provides a front facet detector signal which may be subtracted from a data signal indicative of data stored on the data track to limit the effect of optical source noise. The optical source and the grating beam splitter may be part of an LDGU and contained within a single package.

In accordance with another aspect of the present invention, a method of generating a front facet detector signal is provided. The method includes the steps of applying a radiation beam to a multi-element grating beam splitter, such that a first portion of the radiation beam passes through the multi-element grating beam splitter, and a second portion of the radiation beam is reflected from a reflection grating in the multi-element grating beam splitter; applying the first portion of the radiation beam to the data track; applying the second portion of the radiation beam to a front facet detector to generate the front facet detector signal; separating a first and a second portion of a return beam resulting from application of the radiation beam to the data track, in first and second grating elements of the grating beam splitter, respectively, along at least one plane substantially parallel to a reference plane defined by an optical axis of the radiation beam and a tangent to the data track; and separating a third and a fourth portion of the return beam in third and fourth grating elements of the grating beam splitter, respectively, along planes substantially perpendicular to the reference plane. The first and second return beam portions are used to generate a tracking error signal, and the third and fourth portions are used to generate a focus error signal. The front facet detector signal may be subtracted from, for example, a data signal resulting from detection of the first, second, third and fourth return beam portions.

The present invention provides an LDGU-based optical system capable of generating focus error, tracking error and data signals with reduced optical source noise and improved throughput efficiency, and with reduced cross-talk. The present invention generates these signals using a limited number of optical components, and therefore without significantly increasing the cost and complexity of the optical system. An LDGU in accordance with the present invention may be used to both read from and write to an optical recording medium.

Further features of the invention, its nature and various advantages will become more apparent from the accompanying drawings and the following detailed description of the invention.

DETAILED DESCRIPTION OF THE PREFERRED EMBODIMENTS

Figures 1, 2, 3:
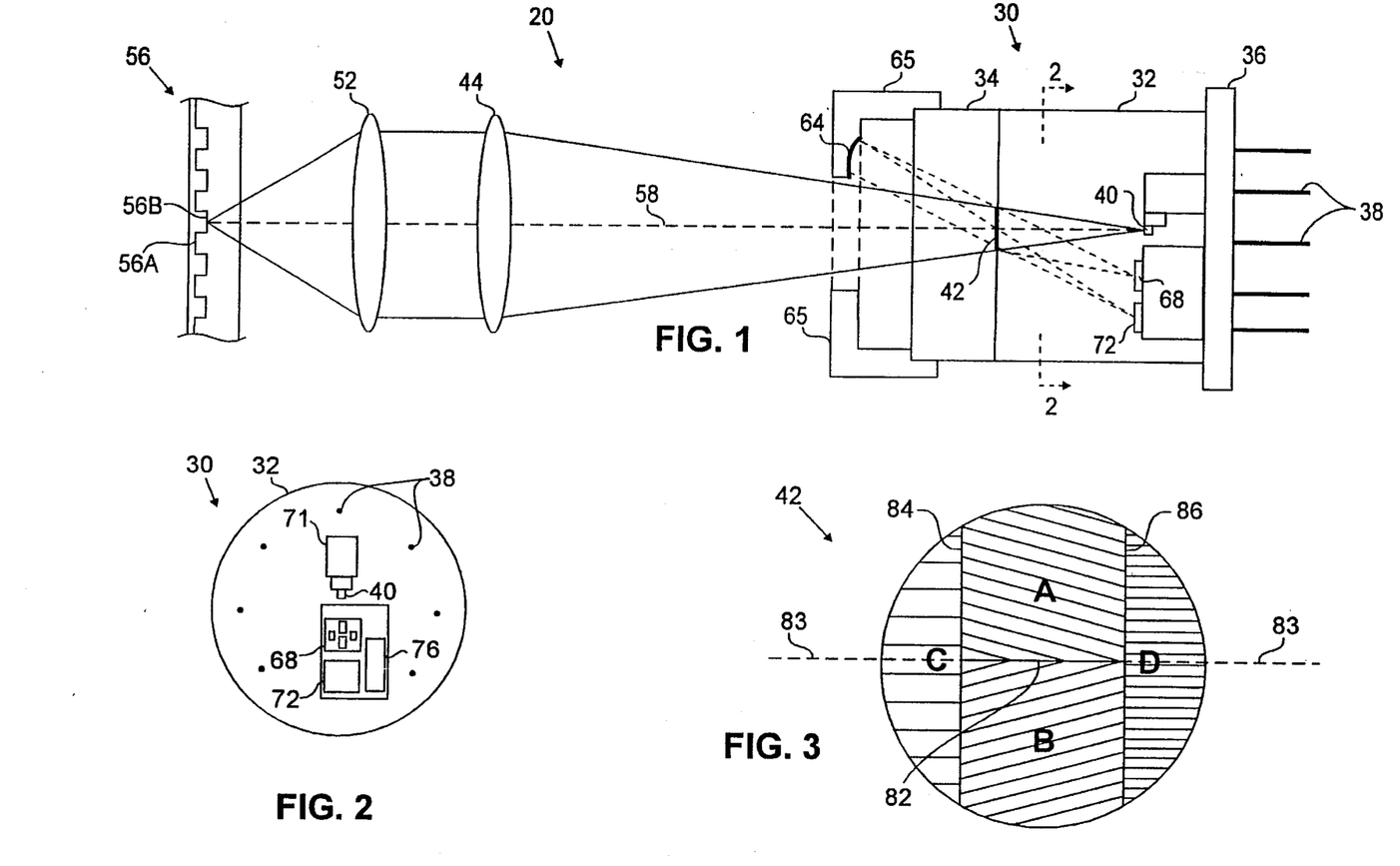
FIG. 1 is a side-sectional view of an optical system which includes an exemplary LDGU in accordance with the present invention.
FIG. 2 is a view of the exemplary LDGU of FIG. 1 taken along the section line 2—2.
FIG. 3 is a detailed view of an exemplary blazed grating beam splitter in accordance with the present invention.

FIG. 1 shows an exemplary optical system 20 in accordance with the present invention. The components of system 20 which process, direct and detect the return beam to provide the FES and TES, and in some cases a data signal, may be collectively referred to as a focus and tracking sensor system. The system 20 may also include additional optical components, such as reflectors, lenses, beam splitters, quarter-wave plates, and gratings, for directing the incident and return radiation beams in directions other than those shown. Furthermore, although the present invention is particularly well-suited for use in optical read/write heads, it may also provide advantages in other optical applications, including, for example, position sensors.

The system 20 includes an LDGU 30 which may be used in an optical read/write head to both read from and write to optical storage media such as recordable CDs. The LDGU 30 combines several optical components into a single package. The LDGU 30 includes a package housing 32, a transparent substrate 34 and a package base 36. The transparent substrate 44 may be glass, plastic, or other transparent material. Although the package shown is a can type package, the various components of LDGU 30 may be enclosed in other types of packages as required for a given application. A number of contact pins 38 protrude from the package base 36 for connecting the LDGU 30 to external electronic circuitry (not shown). The LDGU 30 also includes an optical source 40 which is typically a laser diode. Alternatively, the optical source 40 may be a compact laser. The optical source 40 generates a radiation beam which is incident on a grating beam splitter 42 formed on an inner surface of the transparent substrate 34. The grating beam splitter 42 is preferably a blazed grating beam splitter.

The transparent substrate 34 is arranged between the optical source 40 and an optical storage medium such that the radiation beam passes through the substrate. A zeroth order diffraction component of the radiation beam passes undeflected through the transparent substrate 34 and the grating beam splitter 42 formed thereon and is collimated by collimating lens 44. The radiation beam is then focused by an objective lens 52 onto an optical storage medium 56, which may be, for example, a recordable CD. Only a portion of the optical storage medium 56 is shown in FIG. 1. The radiation beam is used to store and retrieve information from the optical storage medium 56, and typically has a linear polarization. Alternatively, the incident radiation beam could have other polarizations. For example, a quarter-wave plate (not shown) may be arranged between collimating lens 44 and objective lens 52 to provide a circular polarization to the radiation beam. In other embodiments, the incident radiation beam could be unpolarized.

Any of a number of well-known techniques may be used to form the blazed grating beam splitter 42 on the transparent substrate 34. For example, appropriate grating patterns could be photolithographically formed in a layer of photoresist on a surface of substrate 34, an ion milling beam could be used to mill the grating patterns onto the substrate 34, or the grating patterns could be formed using molded clear epoxy or resins. In addition, the grating beam splitter could be formed using holographic techniques, in which, for example, two or more laser beams are used to create an interference pattern in a thin layer of photoresist. These and other grating formation techniques are well-known in the art and will not be further described herein. Furthermore, although the grating beam splitter 42 is shown in LDGU 30 on an inner surface of transparent substrate 34, it could also be formed on an outer surface of the substrate, or partially formed on both inner and outer surfaces of the substrate. It may be preferable in many applications, however, to form the grating beam splitter on an inner surface in order to protect it from contaminants.

In another embodiment of the present invention, the transparent substrate could be, for example, a thin film on which a grating beam splitter is formed. The thin film could be mounted in an aperture (not shown) in LDGU 30 such that the incident radiation beam and return beam pass through the thin film transparent substrate and the grating beam splitter. In these and other embodiments, the grating beam splitter may alternatively be formed within the transparent substrate, rather than on an inner or outer surface thereof. The term "transparent substrate" is defined herein as any transparent material, including glass, plastic or film, which may be used to support a grating beam splitter formed therein or thereon.

The optical storage medium 56 includes a surface 56A having a number of data tracks formed thereon. Each data track 56B is shown in cross-section and generally extends in a direction perpendicular to the plane of the drawing. The data track 56B is a type of diffraction component-generating structure. The structure diffracts the incident radiation beam because the depth of the structure is generally a fraction of the wavelength of the incident radiation beam and introduces phase differences in the return beam. Although the data track 56B is shown as a raised structure in the exemplary system 20 of FIG. 1, a data track in accordance with the present invention may also be, for example, a groove in the storage medium, a region between two grooves in the storage medium, a series of unconnected raised regions, or other optical path structures of appropriate dimension and refractive index such that diffraction patterns are created in response to an incident radiation beam.

It should be noted that although the data tracks are generally arranged in a spiral configuration on an optical storage medium such as a recordable CD, a given portion of the data track 56B around a point currently illuminated by the incident radiation beam will exhibit little curvature and therefore such a portion may be considered substantially straight. A projection of such a portion of data track 56B on the grating beam splitter 42 will generally lie in a plane separating part of the grating beam splitter 42 into first and second grating elements. A dashed line 58 is drawn in FIG. 1 between a currently illuminated data track 56B and the center of the grating beam splitter 42. The line 58 represents an optical axis of the incident radiation beam and is perpendicular to the data track 56B and the projection thereof onto grating beam splitter 42. A reference plane is defined herein by the optical axis 58 of the incident radiation beam and a tangent to the data track 56B at the point currently illuminated by the incident radiation beam. The substantially straight portion of the data track 56B may be considered part of the tangent to the data track 56B. The projection of data track 56B onto grating beam splitter 42 also generally lies within the reference plane.

The data track 56B reflects and diffracts the incident radiation beam applied thereto. The reflected and diffracted incident radiation beam will be referred to herein as a return beam. The return beam is then incident on the grating beam splitter 42, which separates the return beam into a number of different portions. These portions are directed towards a detector array 68. The detector array 68 detects the various portions of the return beam and generates signals which, when combined in the manner described below, provide a TES, an FES and a data signal.

A portion of the incident radiation beam from optical source 40 passing through the grating beam splitter 42 is diffracted by the grating beam splitter 42 toward a reflector 64. The reflector 64 is mounted in and supported by a cap 65. Alternatively, the reflector 64 could be incorporated into the transparent substrate 34 or placed elsewhere in the LDGU package. The reflector 64 reflects the diffracted portion of the incident radiation beam back through the grating beam splitter 42 to a front facet detector 72. The incident radiation beam from optical source 40 is thus separated by grating beam splitter 42 into two radiation beam portions. The first radiation beam portion is applied to the data track 56B of the optical storage medium 56. The second radiation beam portion, which includes light diffracted from grating elements A, B, C and D, is reflected by reflector 64 and applied to front facet detector 72. The front facet detector is an optical detector, such as a photodiode, which generates a signal indicative of the optical power level of the incident radiation beam supplied from source 40. The front facet detector signal is used herein to limit the effect of optical source noise. An exemplary technique for using the front facet detector signal to control optical source noise is referred to as front facet subtraction and is described in the above-cited U.S. patent application Ser. No. 07/961,965. Other noise reduction techniques based on a signal indicative of optical source power may also be used.

Front facet subtraction reduces the effect of optical source noise in a detected return beam. Many commonly-used optical sources have a number of different lasing modes, each producing a radiation beam at a slightly different wavelength. Part of the return beam reflected from the optical storage medium returns to the optical source and may produce longitudinal mode-hopping, in which the source hops between two or more of its lasing modes. Longitudinal mode-hopping generally causes intensity noise on the radiation beam produced by the source. Front facet subtraction involves detecting a portion of the incident radiation beam before it arrives at the optical storage medium, adjusting its amplitude and phase delay, and subtracting it from the detected return beam. The technique is referred to as front facet subtraction because the incident radiation beam, a portion of which is subtracted from the detected return beam, generally exits the front facet of a laser diode optical source. Front facet subtraction may be applied in the present invention by, for example, subtracting a signal generated by the front facet detector 72 from signals generated by the detectors in detector array 68. In one possible embodiment of the present invention, a front facet detector signal is subtracted from the data signal described below. Additional detail may be found in the above-cited U.S. patent application Ser. No. 07/961,965.

FIG. 2 shows a view of the LDGU 30 taken along the section line 2—2 of FIG. 1. A post 71 holds the optical source 40 in place and also serves as a heat sink. The front facet detector 72 and detector array 68 are suitably arranged for receiving portions of the incident and return beams, respectively, as described above. The exemplary LDGU 30 also includes a preamplifier 76 connected to the detector array 68 for amplifying signals generated in the detector array 68 and/or the front facet detector 72. The amplified signals from preamplifier 76 are then supplied to electronic circuitry (not shown) for combining the signals to generate an FES, a TES and a data signal in a manner to be described below. Alternatively, certain detector signals, such as those generated by detector elements c, c', d and d', could be combined prior to amplification. The preamplifier 76 preferably includes a separate low-noise amplifier for each detector in the detector array 68 and may be implemented as, for example, an Application-Specific Integrated Circuit (ASIC). Exemplary types of preamplifiers which may be used include transimpedance amplifiers. The placement of preamplifier 76 within LDGU 30 allows for short lead lines between a given detector and its corresponding low-noise amplifier, and therefore reduces noise pickup and allows an increase in signal bandwidth. The electrical interconnections between the low-noise amplifiers in preamplifier 76 and the detectors in detector array 68 would be readily apparent to one skilled in the art and are therefore not shown. In alternative embodiments, the preamplifier 76 could be eliminated.

FIG. 3 shows a detailed view, in a plane parallel to the plane of section 2—2, of an exemplary blazed grating beam splitter 42 in accordance with the present invention. The exemplary blazed grating beam splitter 42 includes first, second, third and fourth grating elements A, B, C and D, respectively. In a preferred embodiment of the present invention, the grating elements A, B, C and D of the grating beam splitter 42 are blazed gratings. Blazed gratings are commonly used in optical systems and their operation and high efficiency properties are generally well-known. In alternative embodiments, other types of gratings could be used, including, for example, sinusoidal gratings, ruled gratings and holographic structures. Each grating element includes a grating pattern as shown in FIG. 3. The line spacings, line widths, blaze angles, and other dimensions of the grating patterns in each grating element may vary depending upon the application, and can be readily determined in a well-known manner.

The first and second grating elements A and B of FIG. 3 are divided along a line 82 which is parallel to the above-described tangent to the data track 56B. The line 82 is also substantially parallel to a projection 83 of the tangent to the data track 56B onto the grating beam splitter 42, and lies in the reference plane defined by the optical axis 58 and the tangent to the data track 56B. The third and fourth grating elements C and D are arranged adjacent to and on opposite sides of the first and second grating elements A and B. The elements C and D are separated from elements A and B by lines 84 and 86, respectively, which are perpendicular to the data track 56B or the projection 83 of the data track 56B on the grating beam splitter 42. The grating elements A, B, C and D separate the return beam into four different portions, along planes which contain the lines 82, 84 and 86. The first and second grating elements A and B separate the return beam along the reference plane defined above. In other embodiments, the first and second grating elements could separate the return beam along another plane substantially parallel to the reference plane, or along two different planes substantially parallel to the reference plane. The third and fourth grating elements C and D separate the return beam along planes substantially perpendicular to the reference plane. In this exemplary embodiment, each of the resulting portions of the return beam is focused on a different detector in detector array 68.

Figures 4, 5, 6:
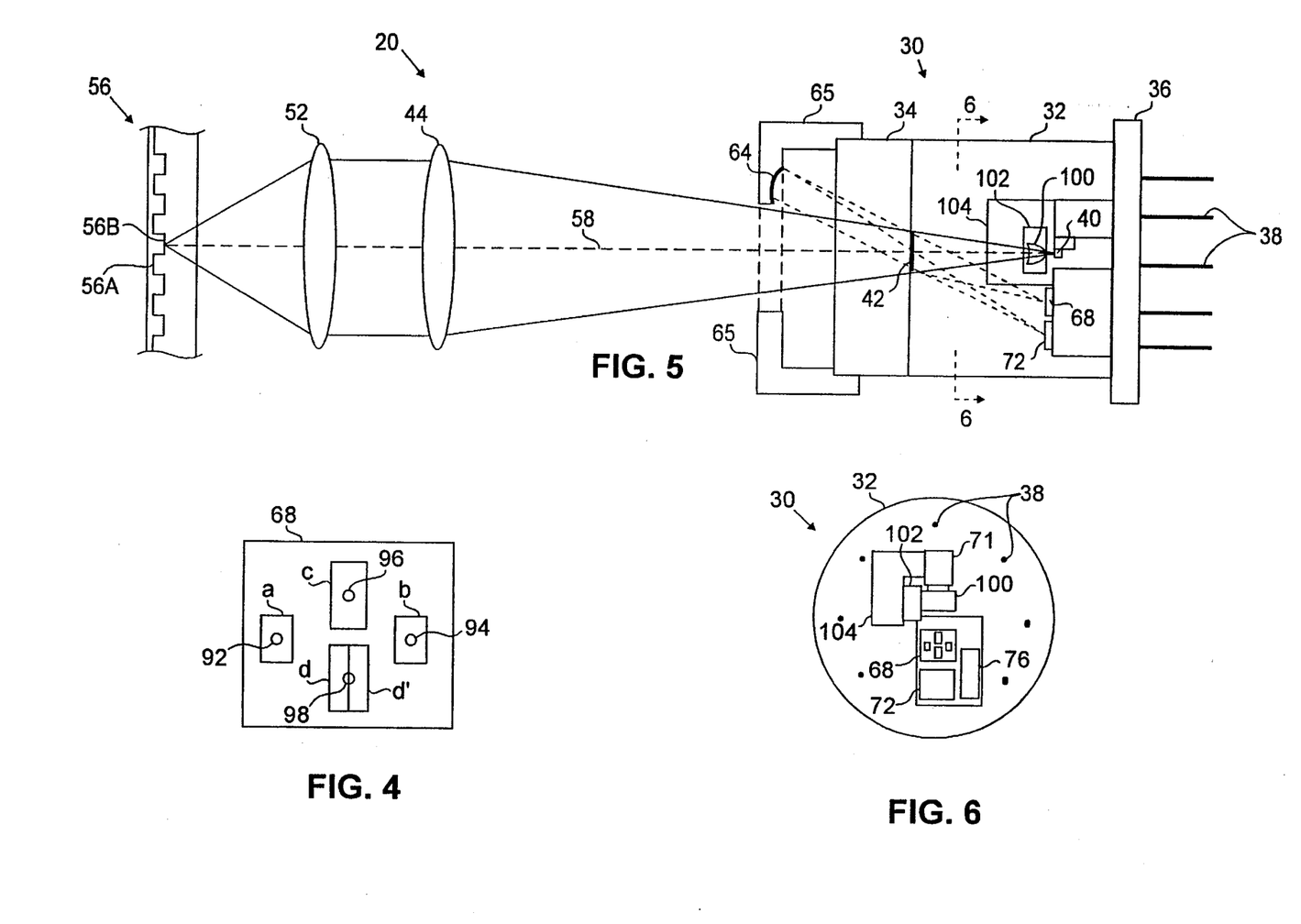
FIG. 4 is a detailed view of an exemplary detector array in accordance with the present invention.
FIG. 5 is a side-section view of an optical system which includes an alternative embodiment of an exemplary LDGU in accordance with the present invention.
FIG. 6 is a view of the exemplary LDGU of FIG. 5 taken along the section line 6—6.

FIG. 4 shows the exemplary detector array 68 in greater detail. The detector array 68 includes four detectors a, b, c and d, d' for detecting the first, second, third and fourth portions of the return beam, respectively. The first, second and third detectors are single element detectors, designated in FIG. 4 as detector elements a, b and c, respectively. The fourth detector is a dual element detector with detector elements d and d'. In other embodiments, the third detector c may be a dual element detector rather than a single element detector. Each detector element may be, for example, a photodiode, a group of photodiodes, or another type of photodetector. Exemplary focus spots 92, 94, 96 and 98 indicate an area of each detector on which the first, second, third and fourth return beam portions, respectively, may be focused when the incident radiation beam is on-track and in-focus relative to the optical storage medium. It should be emphasized that this particular arrangement of detectors is exemplary only. For example, the detectors shown may include additional detector elements or fewer detector elements in other embodiments of the present invention. In addition, each of the detectors need not be part of a single detector array. As will be discussed in greater detail below, the grating elements and corresponding detector elements are arranged such that the optical cross-talk between tracking and focus signals is minimized.

In the exemplary embodiment of FIG. 3, the grating patters shown are suitable for directing the first, second, third and fourth separated portions of the return beam onto detectors a, b, c and d, d', respectively, of detector array 68. The pattern line spacings in element C are wider than those in D, and in both C and D the pattern lines are substantially parallel to line 82. The pattern line spacings in elements A and B are the same, while narrower than those in C and wider than those in D. In addition, the pattern lines in A and B are slanted at equal but opposite angles relative to line 82.

It should also be noted that the arrangement of grating elements shown in FIG. 3 is exemplary only, and alternative embodiments of the present invention may utilize other arrangements. For example, the various elements of the grating beam splitter 42 may be separated by lines which deviate from the parallel or perpendicular lines shown in FIG. 3 by up to about ten percent. The terms "substantially parallel" and "substantially perpendicular," as used herein, include deviations of at least ten percent from parallel and perpendicular, respectively. Although the amount of optical cross-talk may increase as a result of such deviations, an improvement over most current prior art systems would generally still be obtained. In addition, although a four element grating beam splitter may be preferred in many applications, the grating beam splitter could include more or less than four grating elements. For example, an embodiment which does not require a data signal may include only the three grating elements A, B and C, or A, B and D. In a three-element embodiment, the return beam is separated into three portions, along a subset of the planes described above in conjunction with FIG. 3, and the third portion of the return beam is used to generate an FES. The third detector could be a dual element detector c, c', similar to detector d, d', suitable for use in generating an FES. In a three-element embodiment which does require a data signal, the elements A and B could be modified in size and shape to also receive the portion of the return beam which would otherwise fall on the removed element, such that the entire return beam is still incident on the detector array. The grating beam splitter 42 may also include additional elements other than the elements shown. One skilled in the art could readily modify the embodiments of FIGS. 1, 3 and 4 to accommodate such additional elements.

In general, the return beam includes a reflected component, also referred to as a zeroth order diffraction component, and a number of higher order diffraction components diffracted by the surface of the optical storage medium. A given diffraction order generally includes both a positive and a negative diffraction component. Although higher order diffraction components may also be present in the return beam, the present invention can be readily understood without further consideration of diffraction components greater than first order. When the reflected component overlaps with the first order diffracted components, interference occurs. This interference may be directed to detectors a and b to provide, for example, a push-pull TES, as will be described below. The two first order diffraction components may be, for example, contiguous with an optical axis of the incident radiation beam, and therefore both may overlap with the reflected component. It should be noted, however, that the present invention may be utilized in systems in which the positive and negative diffraction components overlap with each other as well as with the reflected components. Additional detail regarding diffraction components may be found in, for example, the above-cited U.S. patent application Ser. No. 07/998,179, and pp. 172–179 of A. Marchant, "Optical Recording: A Technical Overview," Addison-Wesley, Reading, Mass., which are incorporated by reference herein.

A tracking error signal (TES) may be generated from the first and second portions of the return beam incident on the first and second detectors a and b, respectively, of the detector array 68. The TES is generated in accordance with the relationship a–b, which indicates that the signal generated by detector element b is subtracted from the signal generated by detector element a. As a result of passing through the above-described grating beam splitter 42, the first and second portions of the return beam each may include a different diffraction component of a given diffraction order, diffracted from the optical storage medium, as well as undiffracted components. The different diffraction component may be either a positive or a negative diffraction component. It should be understood that, in general, only part of any given diffraction component, rather than the entire component, falls within the objective lens aperture and will therefore be incident on grating beam splitter 42. References made herein to a particular diffraction component are thus meant to include any part of that component.

A focus error signal (FES) may be generated from the fourth portion of the return beam incident on the fourth detector d, d' of the detector array 68. An FES is generated in accordance with the relationship d—d', which indicates that the signal generated by detector element d' is subtracted from the signal generated by detector element d. As a result of passing through the above-described grating beam splitter 42, the third and fourth portions of the return beam include both positive and negative diffraction components of a given diffraction order, diffracted from the optical storage medium, as well as undiffracted components. Each of the detector elements d and d' thus receive both diffraction components of a given diffraction order. By subtracting the signals resulting from detection of the fourth portion of the return beam on detector elements d and d', the diffraction components of a given diffraction order substantially cancel out, thereby reducing optical cross-talk. In other embodiments, a dual element detector c, c' could be used for detector c in array 68, with the detector elements c and c' arranged in the same manner as detector elements d and d' of FIG. 4. The third portion of the return beam, alone or in combination with the fourth portion, could then be used to generate an FES. For example, an FES could be generated in accordance with the relationship c—c', which indicates that the signal generated by detector element c' is subtracted from the signal generated by detector element c. Alternatively, an FES could be generated in accordance with the relationship (c+d')–(c'+ d), which indicates that the sum of the signals generated by detector elements c' and d is subtracted from the sum of the signals generated by the detector elements c and d'. In such an embodiment, signals generated by diagonally-arranged detector elements are summed, and the resulting sums subtracted, to provide the FES.

A data signal, indicative of the data stored on data track 56B, may also be generated in the optical system 20. For example, a data signal could be generated by combining the signals generated by each detector element in the detector array 68, in accordance with the relationship a+b+c+d+ d'. Alternatively, signals from a subset of detector elements could be combined to generate a data signal.

System 20 may also include electronic circuitry (not shown) for combining signals generated by the detector elements of detector array 68. The electronic circuitry may include adders, subtracters or other types of signal combiners for generating focus error, tracking error and data signals in accordance with the above-described relationships. Such electronic circuitry is generally well-known in the art and will therefore not be further described herein.

In general, the orientation and location of the detector elements a and b is not critical to the operation of the present invention, and the arrangement in FIG. 4 or other alternative arrangements may be chosen in order to satisfy detector array packaging constraints or other criteria. The position of the fourth detector elements d and d' may also be varied but the division between the pair should generally be along a line substantially perpendicular to the data track 56B, or the projection 83 of the data track 56B on the grating beam splitter 42. This division line is also substantially perpendicular to the above-defined reference plane.

The grating beam splitter 42 of the present invention may be replaced with other optical devices capable of dividing the return beam reflected and diffracted from a data track into a number of distinct portions in accordance with the above description. Alternatives to the grating beam splitter 42 include, for example, holograms. In addition, as mentioned above, the grating or other optical device used to separate the return beam into its respective portions may include more or less than four elements. The elements could be suitably arranged to separate the return beam into portions which, when detected, generate signals which may be combined in accordance with the present invention such that optical cross-talk is minimized.

FIG. 5 shows an alternative embodiment of the present invention in which a lens 100 is arranged between the optical source 40 and the grating beam splitter 42 in the path of the radiation beam. The lens 100 is aligned and mounted in front of the optical source and substantially circularizes the radiation beam. A radiation beam from an optical source such as a laser diode generally has an elliptical cross-section. When such a radiation beam is circularized, it becomes rotationally symmetric about its optical axis, and exhibits a generally circular cross-section. A circularized radiation beam in accordance with the present invention need not be perfectly circular in cross-section. The lens 100 significantly improves the optical throughput efficiency of the LDGU in part because less light must be truncated from the radiation beam in order to produce a reasonably round focused spot at the optical medium surface. The lens 100 is preferably an anamorphic lens and may be, for example, a model VPS700 refractive lens available from Blue Sky Research, San Jose, Calif. Alternatively, the lens 100 may be a diffractive lens rather than a refractive lens. FIG. 6 shows a view of the LDGU 30 of FIG. 5 taken along the section line 6—6. A base 102, or other suitable mechanism, is attached to lens 100 and supports the lens 100 in front of the optical source 40. A bracket 104 supports base 102. In alternative embodiments, the lens 100 could be placed at any of a number of other locations in the path of the incident radiation beam.

In another embodiment of the present invention, the transparent substrate 34 and grating beam splitter 42 could be arranged between the collimating lens 44 and the objective lens 52. The grating beam splitter 42 would generally be located close to the collimating lens 44 in such an embodiment. The location and design of the reflector 64 could then be suitably modified to reflect the diffracted portions of the incident radiation beam to the front facet detector 72. This alternative embodiment could be used in the systems of FIGS. 1, 5 and 7.

In another embodiment of the present invention, the LDGU 30 might also incorporate all or a portion of the optical source driver electronics. The driver electronics may include, for example, a high frequency injection (HFI) circuit and a laser driver, both of which are well-known in the art. HFI is described in, for example, E. Gage and S. Beckens, "Effects of high frequency injection and optical feedback on semiconductor laser performance," SPIE Proceedings, Vol. 1316, Optical Data Storage, pp. 199–204, March 1990, which is incorporated by reference herein. In addition, the LDGU 30 could include a rear facet detector. The rear facet detector is typically an optical detector, such as a photodiode, which detects light radiated out a back end of an optical source, also referred to as a rear facet in the context of a laser diode optical source. The above-described front facet subtraction technique could be implemented using a rear facet detector in combination with or in place of the front facet detector. However, the use of a front facet detector is generally preferred in that light radiated from a rear facet may not be perfectly correlated in intensity to the light radiated from the front facet.

Figure 7:
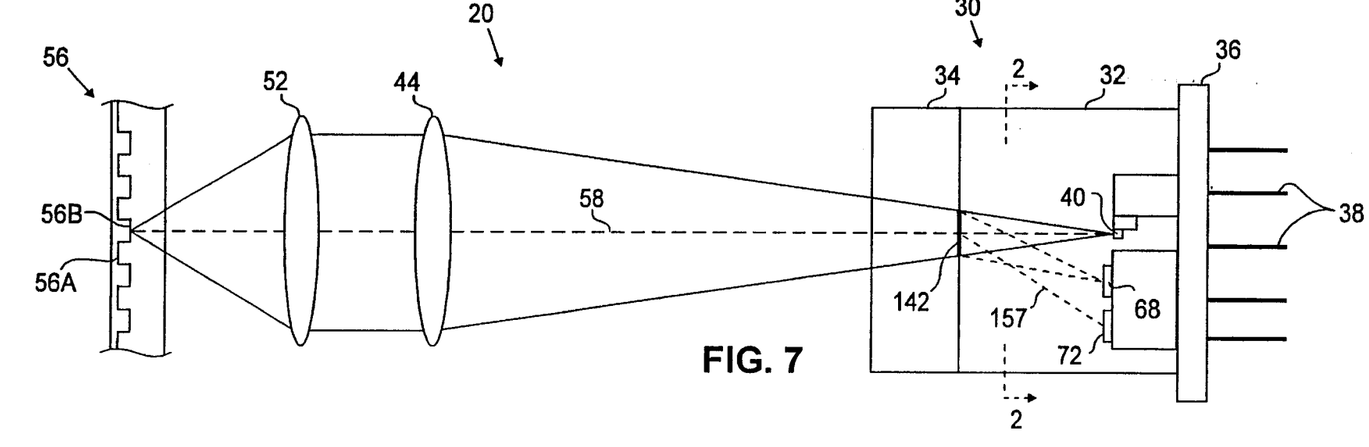
FIG. 7 is a side-sectional view of an optical system which includes another alternative embodiment of an exemplary LDGU in accordance with the present invention.
Figure 8:
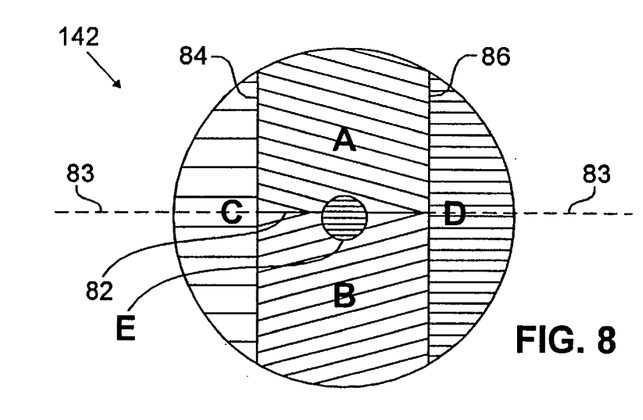
FIG. 8 is a detailed view of an exemplary blazed grating beam splitter suitable for use in the LDGU of FIG. 7.

FIG. 7 shows optical system 20 with another alternative embodiment of an LDGU in accordance with the present invention. In the embodiment shown, reflector 64 and cap 65 are eliminated, and four-element grating beam splitter 42 is replaced with a five-element grating beam splitter 142. FIG. 8 shows a detailed view, in a plane parallel to the plane of section 2—2, of grating beam splitter 142. Grating beam splitter 142 includes grating elements A, B, C and D, arranged as described above in conjunction with FIG. 3. Grating beam splitter 142 also includes a fifth grating element E, circular in shape, arranged between grating elements A, B, C and D. The fifth grating element E directs a portion of the incident radiation beam, shown in FIG. 7 as a beam 157, onto the front facet detector 72. The grating element E is preferably a reflection grating, which can generate a number of reflected diffraction orders. The beam 157 is thus referred to herein as a reflected diffracted beam, and is detected in front facet detector 72. The resulting front facet detector signal may be used, for example, to perform front facet subtraction in the manner previously described.

The grating elements A, B, C and D of grating beam splitter 142 separate a return beam into first, second, third and fourth portions, respectively, along planes containing lines 82, 84 and 86. Grating element E is also preferably a blazed grating, and in the exemplary embodiment shown is centered on the optical axis of the radiation beam, on line 82 adjacent elements A and B and midway between elements C and D. In order to direct the beam 157 to the front facet detector 72, element E includes grating pattern lines oriented substantially parallel to the grating pattern lines of elements C and D, but with line spacings narrower than those in element D. Of course, alternative grating patterns could also be used to direct the beam 157. The efficiency of the grating element E may be improved by coating it with a reflective material, such as gold or aluminum. The grating element E could be opaque, such that it generates only reflected diffraction orders, or it could be partially transparent, such that it generates both transmitted and reflected diffracted orders.

It should be noted that the size, shape and location of element E are exemplary only. The size and shape of element E will generally depend upon the amount of light needed to generate the front facet detector signal, the efficiency of the grating, and the location of the element. In addition, the element E could be located in any of a number of other positions in the grating beam splitter 142, as long as it is able to receive and diffract a portion of the incident radiation beam. Furthermore, the element E may be replaced with two or more discrete reflection grating elements, placed in various locations in the grating beam splitter 142.

The embodiment of FIGS. 7 and 8 may provide advantages in certain applications. In general, optical head alignment is simplified because the beam directed to the front facet detector 72 includes light diffracted from a single grating element, rather than light diffracted from each of the four grating elements A, B, C and D as in the embodiment of FIGS. 1 and 3. A single alignment of the grating beam splitter 142 can provide proper detection of the front facet detector signal generated from the incident radiation beam, as well as the focus and tracking error signals generated from the return beam. Furthermore, the reflected diffraction orders 157 provided by element E does not require, and additional converging means such as reflector 64 and cap 65 is not needed.

Although the foregoing detailed description has illustrated the present invention primarily in terms of a particular optical information storage and retrieval system, it should be understood that the embodiments described are exemplary only. Many variations may be made in the arrangements shown, including, for example, the type of grating beam splitter used to separate the return beam and the arrangement, shape and number of grating elements, the number of portions into which the return beam is separated, the arrangement of detectors and detector elements onto which the portions of the return beam are focused, and the type and arrangement of optical components for directing the incident and return radiation beams in the optical system. These and other alternatives and variations will be readily apparent to those skilled in the art, and the present invention is therefore limited only by the appended claims.

| PARTS LIST | |
|---|---|
| A, B, C, D, E | grating elements |
| a, b, c, d, d' | detectors |
| 20 | optical system |
| 30 | laser-detector-grating unit (LDGU) |
| 32 | package housing |
| 34 | transparent substrate |

PARTS LIST -continued

| | |
|---|---|
| 36 | package base |
| 38 | contact pins |
| 40 | optical source |
| 42 | grating beam splitter |
| 44 | collimating lens |
| 52 | objective lens |
| 56 | optical storage medium |
| 56A | optical storage medium surface |
| 56B | data track |
| 58 | optical axis |
| 64 | reflector |
| 65 | cap |
| 68 | detector array |
| 71 | post |
| 72 | front facet detector |
| 76 | preamplifier |
| 82 | line |
| 83 | projection |
| 84, 86 | lines |
| 92, 94, 96, 98 | focus spots |
| 100 | lens |
| 102 | base |
| 104 | bracket |
| 142 | grating beam splitter |
| 157 | reflected diffracted beam |

What is claimed is:

1. A multi-element grating beam splitter for use in an optical system having an optical source for generating a radiation beam to be applied to a data track of an optical storage medium, said grating beam splitter comprising:

a first grating element;

a second grating element, said first and said second grating elements arranged on opposite sides of a plane substantially parallel to a reference plane defined by an optical axis of said radiation beam and a tangent to said data track, such that said first and said second grating elements separate a first and a second portion, respectively, of a return beam resulting from application of said radiation beam to said data track, along at least one plane substantially parallel to said data track;

a third grating element, arranged adjacent to and on one side of said first and said second grating elements, to separate a third portion of said return beam along a plane substantially perpendicular to said reference plane;

a fourth grating element, arranged adjacent to and on an opposite side of said first and said second grating elements, to separate a fourth portion of said return beam along another plane substantially perpendicular to said reference plane; and a fifth grating element for directing a portion of said radiation beam to a front facet detector.

2. The grating beam splitter of claim 1 wherein said first and said second portions of said return beam provide a tracking error signal.

3. The grating beam splitter of claim 1 wherein said third and said fourth portions of said return beam provide a focus error signal.

4. The grating beam splitter of claim 1 wherein said portion of said radiation beam directed to said front facet detector provides a front facet detector signal suitable for subtraction from a data signal indicative of data stored on said data track.

5. The grating beam splitter of claim 1 wherein said fifth grating element is circular in shape.

6. The grating beam splitter of claim 1 wherein said fifth grating element is a reflection grating.

7. The grating beam splitter of claim 1 wherein said fifth grating element is coated with a reflective material.

8. The grating beam splitter of claim 1 wherein said fifth grating element is opaque.

9. The grating beam splitter of claim 1 wherein said fifth grating element is partially transparent.

10. The grating beam splitter of claim 1 wherein said fifth grating element is arranged between said first, second, third and fourth grating elements.

11. The grating beam splitter of claim 10 wherein said fifth grating element is centered between said third and said fourth grating elements on a line separating said first and said second grating elements.

12. A method of providing a front facet detector signal in an optical system, said optical system having an optical source for generating a radiation beam to be applied to a data track of an optical storage medium, said method comprising the steps of:

applying said radiation beam to a multi-element grating beam splitter, such that a first portion of said radiation beam passes through said multi-element grating beam splitter, and a second portion of said radiation beam is reflected from a reflection grating in said multi-element grating beam splitter;

applying said first portion of said radiation beam to said data track;

applying said second portion of said radiation beam to a front facet detector to generate said front facet detector signal;

separating a first and a second portion of a return beam resulting from application of said radiation beam to said data track, in first and second grating elements of said grating beam splitter, respectively, along at least one plane substantially parallel to a reference plane defined by an optical axis of said radiation beam and a tangent to said data track; and separating a third and a fourth portion of said return beam in third and fourth grating elements of said grating beam splitter, respectively, along planes substantially perpendicular to said reference plane.

13. The method of claim 12 further including the step of generating a tracking error signal from said first and said second portions of said return beam.

14. The method of claim 12 further including the step of generating a focus error signal from said third and said fourth portions of said return beam.

15. The method of claim 12 further including the step of subtracting said front facet detector signal from a data signal indicative of data stored on said data track.

16. The method of claim 12 further including the steps of:

detecting said first, second, third and fourth portions of said return beam in first, second, third and fourth detectors of a detector array, respectively;

generating a data signal indicative of data stored on said data track by combining signals from said first, second, third and fourth detectors; and subtracting said front facet detector signal from said data signal.

\* \* \* \* \*